(12) United States Patent
Scheim et al.

(10) Patent No.: US 10,120,076 B2
(45) Date of Patent: Nov. 6, 2018

(54) SPATIO-TEMPORAL SCANNING PATTERNS FOR ARRAY LIDAR SYSTEMS

(71) Applicant: GM Global Technology Operations LLC, Detroit, MI (US)

(72) Inventors: Kobi J. Scheim, Pardess Hanna (IL); Ariel Lipson, Tel Aviv (IL); Ran Y. Gazit, Ra'anana (IL); Oded Bialer, Petah Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 15/145,911

(22) Filed: May 4, 2016

(65) Prior Publication Data

US 2016/0327635 A1    Nov. 10, 2016

Related U.S. Application Data

(60) Provisional application No. 62/158,285, filed on May 7, 2015.

(51) Int. Cl.
*G01S 17/42* (2006.01)
*G01S 17/93* (2006.01)
*G01S 7/481* (2006.01)

(52) U.S. Cl.
CPC .......... *G01S 17/42* (2013.01); *G01S 7/4815* (2013.01); *G01S 17/936* (2013.01)

(58) Field of Classification Search
CPC ........ G01C 3/08; G01S 17/89; G01S 7/4815; G01S 7/484; G01S 7/4817; G01S 7/4868
See application file for complete search history.

(56) References Cited

U.S. PATENT DOCUMENTS

| | | | |
|---|---|---|---|
| 5,682,229 A | 10/1997 | Wangler | |
| 6,188,379 B1 | 2/2001 | Kaneko | |
| 7,508,520 B1 * | 3/2009 | Lines | G01N 21/3504 250/338.5 |
| 8,761,594 B1 | 6/2014 | Gross et al. | |
| 9,413,132 B2 | 8/2016 | Levy et al. | |
| 2008/0309917 A1 | 12/2008 | Zimmermann et al. | |
| 2012/0038903 A1 * | 2/2012 | Weimer | G01C 3/08 356/4.07 |

FOREIGN PATENT DOCUMENTS

| | | |
|---|---|---|
| CN | 101813778 A | 8/2010 |
| CN | 102692622 A | 9/2012 |
| CN | 103994785 A | 8/2014 |

OTHER PUBLICATIONS

Chinese Office Action for CN Application No. 201610299813.4, dated Mar. 13, 2018, pp. 1-9.

* cited by examiner

*Primary Examiner* — Luke D Ratcliffe
(74) *Attorney, Agent, or Firm* — Cantor Colburn LLP

(57) ABSTRACT

An array lidar system on a platform and a method of operating an array lidar system comprising a plurality of illuminators on a platform include controlling a first set of the plurality of illuminators to transmit for a first duration, and controlling a second set of the plurality of illuminators to transmit for a second duration. The method also includes receiving and processing reflections resulting from the first set of the plurality of illuminators and the second set of the plurality of illuminators.

13 Claims, 11 Drawing Sheets

SPATIO-TEMPORAL SCANNING PATTERNS FOR ARRAY LIDAR SYSTEMS

CROSS-REFERENCE TO RELATED APPLICATION

This application is a Non-Provisional of U.S. Provisional Application No. 62/158,285 filed May 7, 2015, the disclosure of which is incorporated herein by reference in its entirety.

FIELD OF THE INVENTION

The subject invention relates to spatio-temporal scanning patterns for array lidar systems.

BACKGROUND

Lidar, which may be referred to as light radar or laser array light detection and ranging, refers generally to transmitting light at a target and receiving and processing a resulting reflection. An array of lasers or other illuminators (e.g, light emitting diode (LED) may be used in an array lidar system to obtain reflections from a wider field of view than is possible with a single illuminator. Typically, an array lidar system may be used to obtain a three-dimensional image of the field of view by operating all the illuminators in turn. However, other detection schemes may be useful in some situations. Accordingly, it is desirable to provide scanning patterns for the array lidar system.

SUMMARY OF THE INVENTION

According to an exemplary embodiment, a method of operating an array lidar system comprising a plurality of illuminators on a platform includes controlling a first set of the plurality of illuminators to transmit for a first duration; controlling a second set of the plurality of illuminators to transmit for a second duration; and receiving and processing reflections resulting from the first set of the plurality of illuminators and the second set of the plurality of illuminators.

According to another exemplary embodiment, an array lidar system on a platform includes a plurality of illuminators arranged in an array; and a controller configured to control a first set of the plurality of illuminators to transmit for a first duration, to control a second set of the plurality of illuminators to transmit for a second duration, and receive and process reflections resulting from the first set of the plurality of illuminators and the second set of the plurality of illuminators.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

As noted above, an array lidar system generally involves illuminating the field of view by operating every illuminator of the array in turn. The array lidar system may be used for detection and ranging in various applications. Exemplary applications of array lidar systems include landslide investigations, archaeology, oil and gas exploration, meteorology, and navigation (e.g., obstacle detection) in automotive applications. Certain applications and situations warrant a different approach to using the array of illuminators than the conventional approach of using each of the illuminators of the array lidar system in turn. Embodiments of the systems and methods detailed herein relate to spatio-temporal scanning patterns implemented by the array lidar system. The embodiments include controlling which illuminators of the array transmit and for how long. For example, based on the field of view, one or more of the illuminators may result in reflections that include (and are overwhelmed by) sunlight or another interfering light source, transmitted light from another lidar, or another interfering source. As another example, a scanning pattern or even an auxiliary sensor may indicate a portion of the field of view of the array lidar system as an area of interest. As yet another example, different illuminators may require a different duration of illumination and related accumulation of reflections to reach a threshold signal-to-noise ratio (SNR). One or more illuminators may be operated until the accumulated reflections result in a threshold SNR. Alternately, one or more illuminators may be operated until the improvement in SNR resulting from accumulated reflections falls below a threshold improvement. While lasers are discussed herein as one specific type of illuminator for explanatory purposes, the embodiments detailed below relate to other types of illuminators used in lidar systems, as well.

Figure 1:
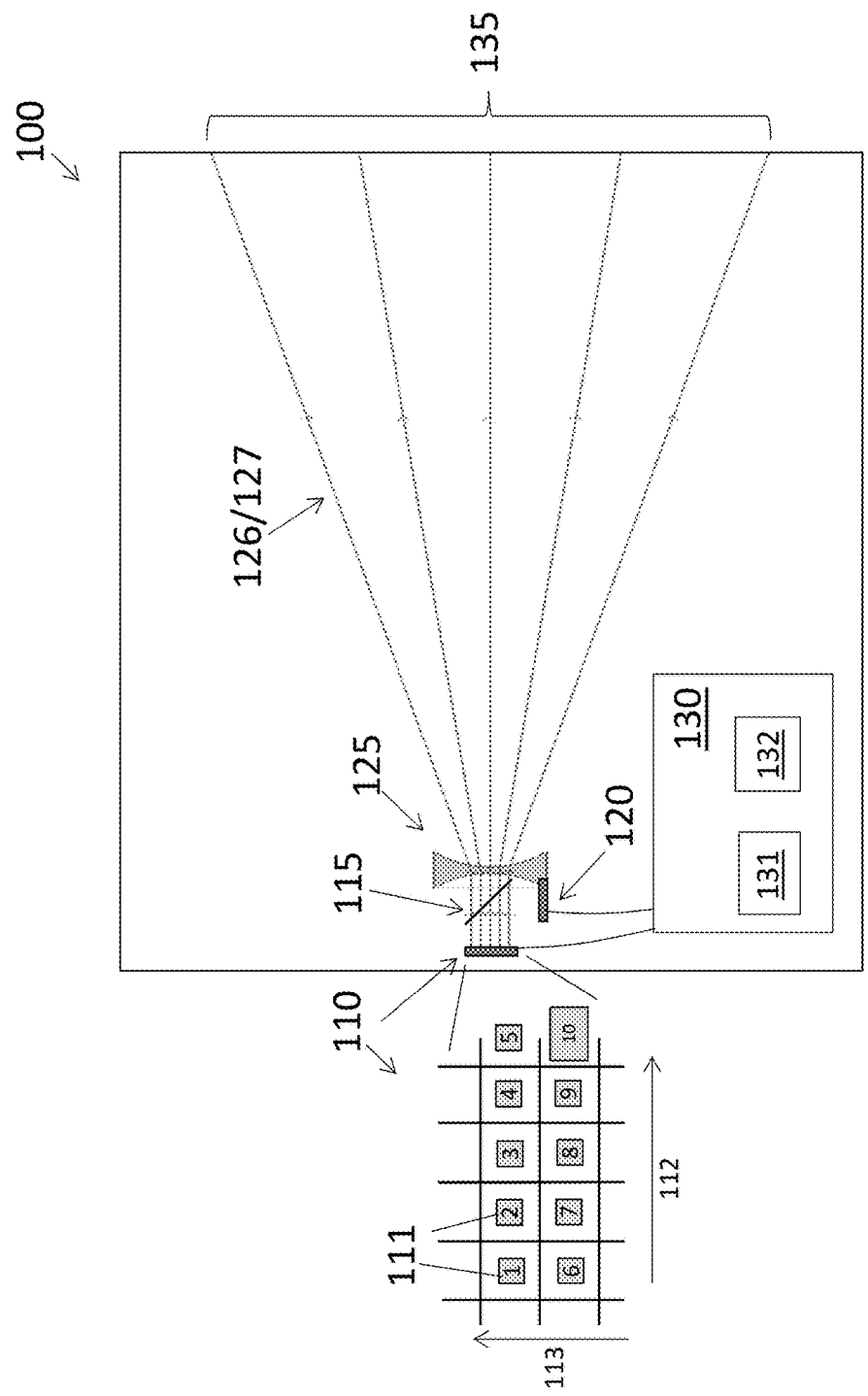
FIG. 1 is a block diagram of an exemplary array lidar system according to embodiments.

FIG. 1 is a block diagram of an exemplary array lidar system 100 according to embodiments. The array lidar 110 refers to an arrangement of two or more lasers 111 in an array such that their transmissions make up a field of view 135. The exemplary array lidar system 110, shown in FIG. 1, includes two rows of five lasers 111-1 through 110-10. The perspective top-down view illustrating the transmission from the array lidar 110 shows the five transmitted signals 126 (laser beams) resulting from one row of lasers 111. The exemplary array lidar system 100 shown in FIG. 1 includes a semi-permeable mirror 115 that focuses light from each laser 111 of the array lidar 110 through a lens 125. The lens 125 disperses the laser beam transmitted by each of the lasers 111 of the array lidar 110 across a field of view 135. An optical detector array 120 receives reflections 127 resulting from the transmitted signals 126 of the array lidar 110. A controller or processing system 130 may include one or more processors 131 and one or more memory devices 132 along with other known components in order to control transmission by each of the lasers 111 of the array lidar 110, as well as processing of received reflections 127 by the optical detector array 120 according to embodiments. In alternate embodiments, the processing of received reflections may be done by another processing system 130 that is in communication with the processing system 130 that controls the array lidar 110. As FIG. 1 shows, the array lidar 110 may be used to scan the field of view 135 in both azimuth 112 and elevation 113. Further each laser 111 gives a range to a target 830 (FIG. 8) in the field of view 135. Thus, the array lidar 110 provides a three-dimensional image in which each reflection resulting from each pulse 210 emission (FIG. 2) by a laser 111 within the transmitted signal 126 may be considered a pixel in the image. The embodiments detailed below relate to controlling the array lidar 110 to control the scan of the field of view 135 (the pixels obtained in each image) according to various scenarios.

Figure 2:
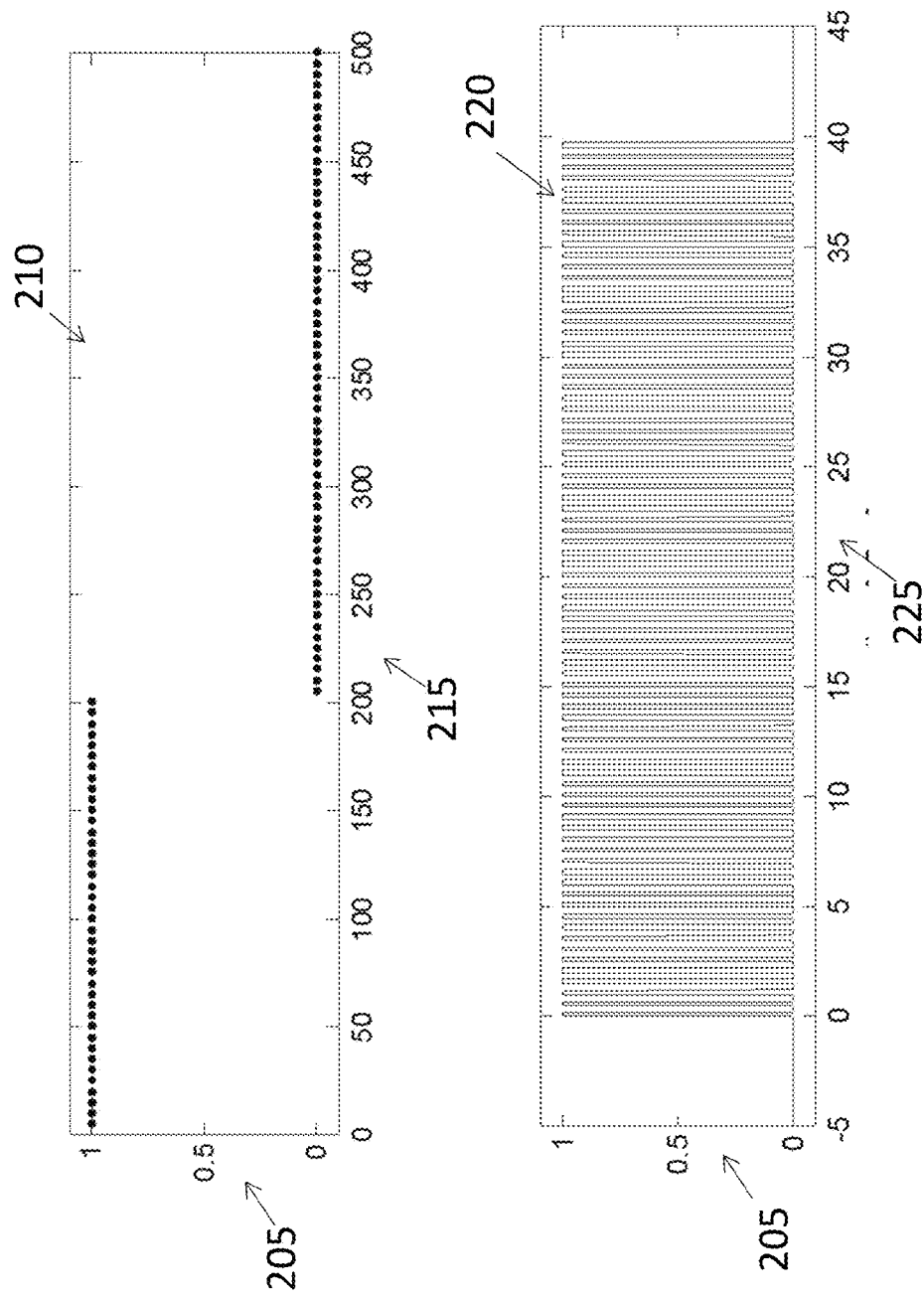
FIG. 2 shows an exemplary pulse and pulse burst transmitted by a laser of an exemplary array lidar of the array lidar system according to embodiments.

FIG. 2 shows an exemplary pulse 210 and pulse burst 220 transmitted by a laser 111 of an exemplary array lidar 110 of the array lidar system 100 according to embodiments. The transmitted power 205 is switched off (value 0) or on (value 1) to create the pulse 210. The time in nanoseconds 215 is indicated and shows that the transmitted power 205 is on for 200 nanoseconds for the exemplary pulse 210. The pulse burst 220 results from a series of pulses 210. The time in microseconds 225 is indicated and shows that the duration of the exemplary pulse burst 220 is 40 microseconds.

Figure 3:
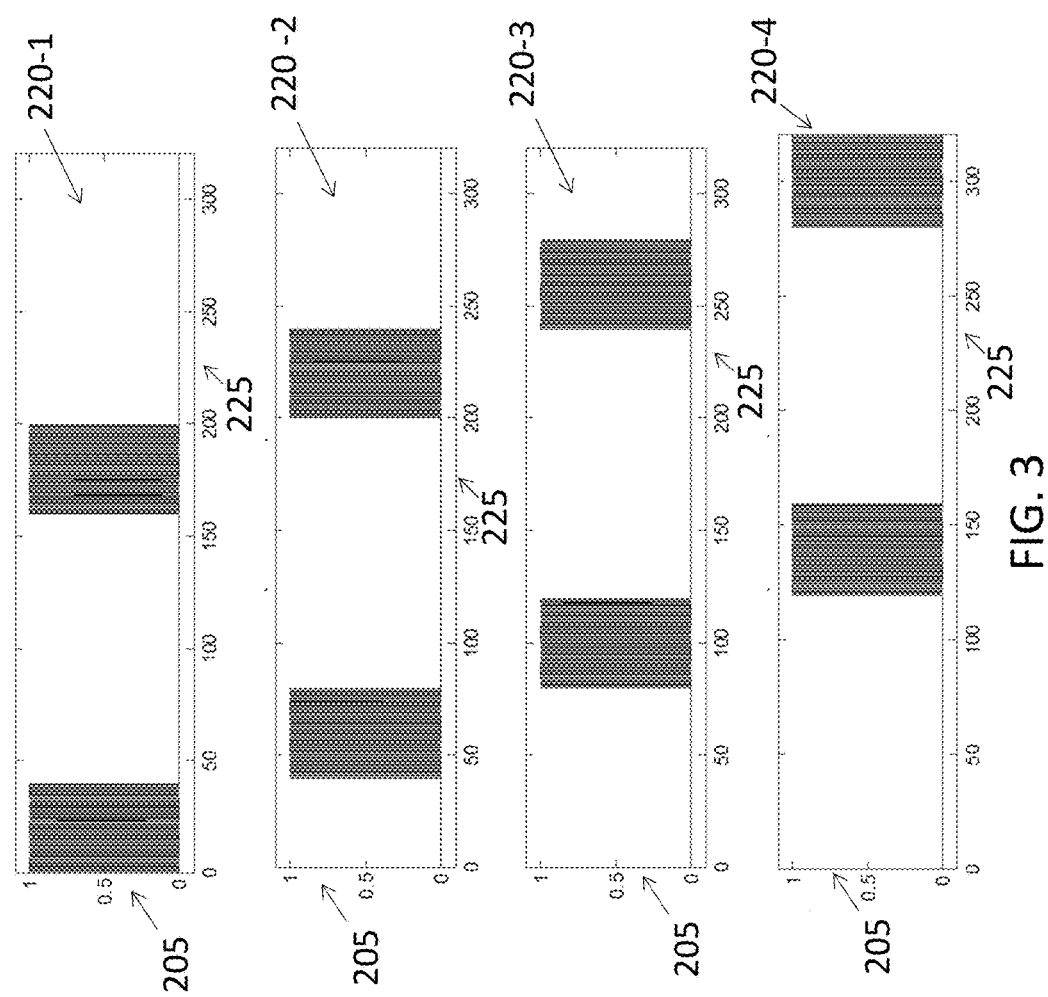
FIG. 3 shows exemplary pulse bursts transmitted by a number of lasers of an exemplary array lidar of the array lidar system according to embodiments.

FIG. 3 shows exemplary pulse bursts 220 transmitted by a number of lasers 111 of an exemplary array lidar 110 of the array lidar system 100 according to embodiments. Four sets of pulse bursts 220-1, 220-2, 220-3, 220-4 are shown corresponding with four lasers 111 of the exemplary array lidar 110. As shown, the pulse bursts 220-1, 220-2, 220-3, 220-4 are transmitted in turn according to a time division multiple access (TDMA) scheme. Because the pulse bursts 220-1, 220-2, 220-3, 220-4 are offset from each other in time, the reflection resulting from each transmission is more easily resolved (i.e., spatial resolution is achieved) than if the transmissions were simultaneous. The pulse duration affects the range resolution. For example, a pulse burst 220 of 0.5 microseconds results in a range resolution of 75 meters. As pulse burst 220 duration increases, the range resolution also increases. The pulse burst 220 duration also affects the scan rate, which in turn affects the maximum target velocity that may be estimated. That is, for example, if a pulse burst 220 duration of 40 milliseconds is used per scan (per transmission cycle), then 25 frames or repetitions of the pulse burst 220 may be performed in one second. When pulse burse 220 duration is increased, the number of frames per second decreases. Thus, as pulse burst 220 duration increases, maximum estimable target velocity decreases.

When a number of lasers 111 must transmit in turn, as in the exemplary TDMA-based array lidar system 100, the duration of each pulse burst 220 must be decreased to achieve the same frame rate as a single laser 111. That is, as noted above, a 40 millisecond pulse burst 220 duration results in a frame rate of 25 frames per second for a single laser 111. However, to achieve the same 25 frames per second rate for an array lidar 110 with a thousand lasers 111, the duration of each pulse burst 220 must be reduced to 40 microseconds. As the discussion above makes clear, this decrease in the duration of the pulse burst 220 maintains the frame rate and, thus, the maximum target velocity that may be estimated but decreases the range resolution. To address the competing interests in range resolution and detectable target velocity, the array lidar 110 may be controlled, according to embodiments detailed herein, to increase the duration of the pulse burst 220 (and, thus, range resolution) only for one or more lasers 111 of the array lidar 110. According to other embodiments, not all of the lasers 111 may be used in one or more scans. These embodiments are detailed below.

Figure 4:
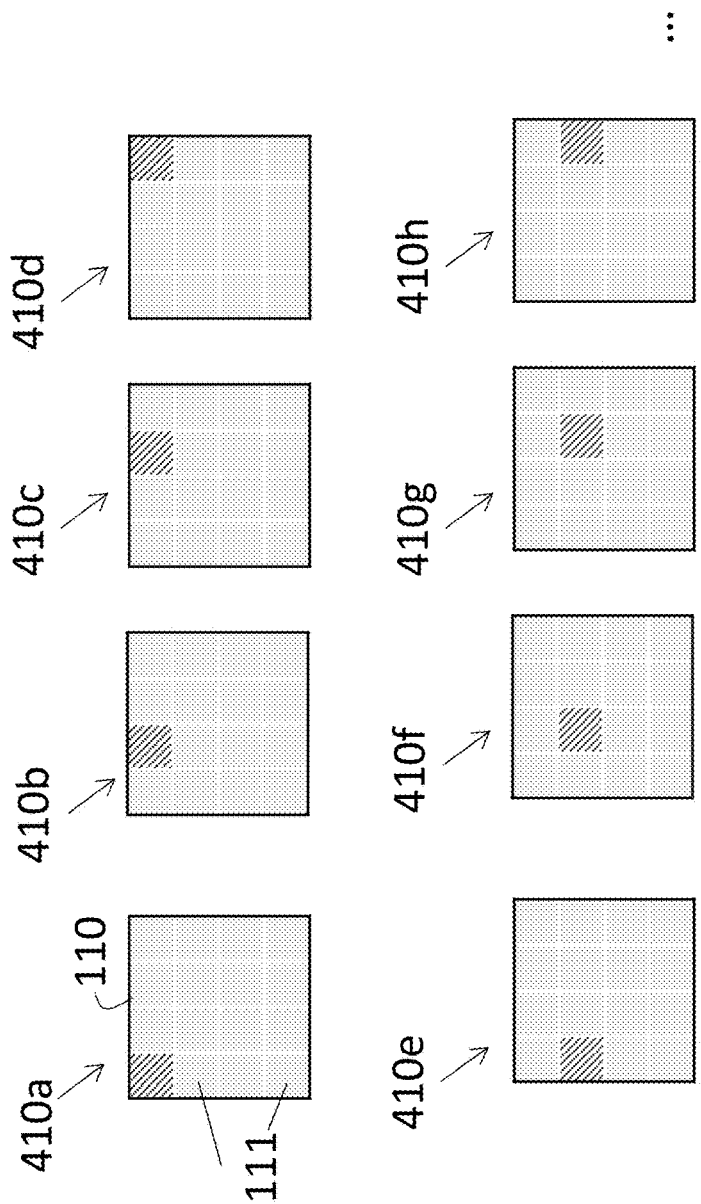
FIG. 4 shows an array lidar that performs a raster scan according to an embodiment.

FIGS. 4-7 illustrate different scanning scenarios employed by the array lidar system 100 according to embodiments. According to each of the embodiments, spatial resolution is not of interest but, instead, identification of a target area for further study is a goal. Accordingly, the TDMA scheme need not be used, and a set of lasers 111 may transmit the same pulse burst 220 at the same time. Alternately, as shown in FIG. 4, a single laser 111 may transmit. Because the goal is target detection rather than velocity estimation or spatial resolution, a longer pulse burst 220 may be transmitted during each scan to increase range resolution. Once an area of a target 830 (FIG. 8) has been identified, only lasers 111 targeting that area may transmit or, as shown in FIG. 9, lasers 111 targeting certain areas may use longer pulse bursts 220 than other lasers 111.

FIG. 4 shows an array lidar 110 that performs a raster scan 410 according to an embodiment. The exemplary array lidar 110 shown in FIG. 4 includes sixteen lasers 111. According to the present embodiment, only one laser 111 transmits during each scan 410. A transmitting laser 111 in the array lidar 110 is indicated by diagonal lines in FIG. 4. Eight exemplary scans 410a through 410h are shown, but the pattern may continue for every laser 111 in the array lidar 110. In alternate embodiments, a different transmission pattern may be followed for the raster scans 410. For example, the scan 410e may follow scan 410a, and each laser 111 within the first column may transmit before scan 410b is performed, followed by scan 410f and so on.

Figure 5:
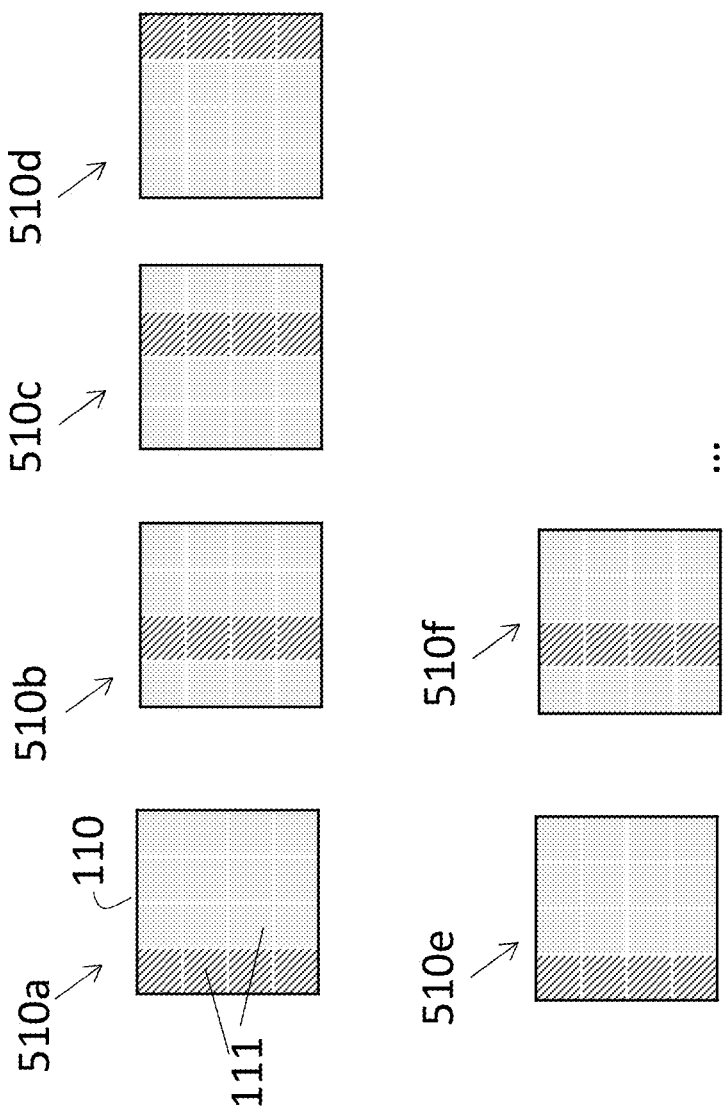
FIG. 5 shows an array lidar that performs a column scan according to an embodiment.

FIG. 5 shows an array lidar 110 that performs a column scan 510 according to an embodiment. The exemplary array lidar 110 shown in FIG. 5, like the exemplary array lidar 110 shown in FIG. 4, includes sixteen lasers 111. According to the present embodiment, one column of lasers 111 in the array lidar 110 transmits during each scan 510. As in FIG. 4, transmitting lasers 111 are indicated by diagonal lines. Six exemplary scans 510a through 510f are shown, but the pattern may repeat (e.g., the scan 510 after scan 510f may be the same as the scan 510c) until a target 830 (FIG. 8) is identified, for example.

Figure 6:
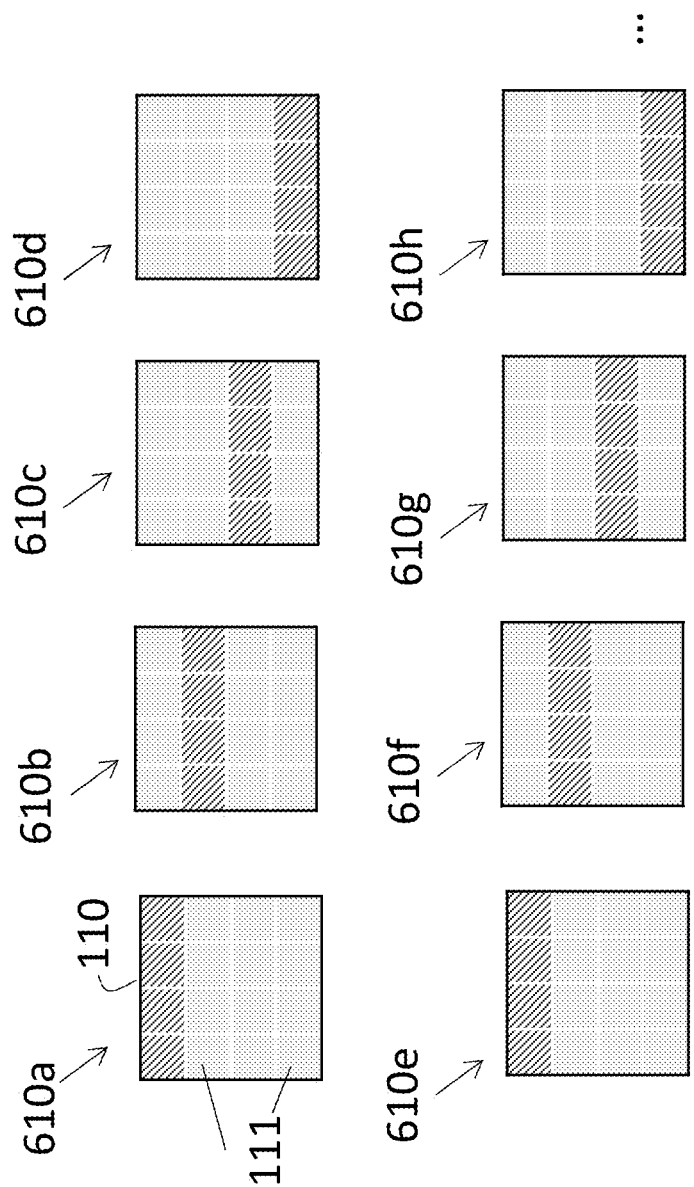
FIG. 6 shows an array lidar that performs a row scan according to an embodiment.

FIG. 6 shows an array lidar 110 that performs a row scan 610 according to an embodiment. The exemplary array lidar 110 shown in FIG. 6, like the exemplary array lidar 110 shown in FIGS. 4 and 5, includes sixteen lasers 111. According to the present embodiment, one row of lasers 111 in the array lidar 110 transmits during each scan 610. As in FIGS. 4 and 5, transmitting lasers 111 are indicated by diagonal lines. Eight exemplary scans 610a through 610h are shown, but the pattern may continue to repeat (e.g., the scan 610 after scan 610h may be the same as the scans 610a and 610e) until a target 830 (FIG. 8) is identified, for example.

Figure 7:
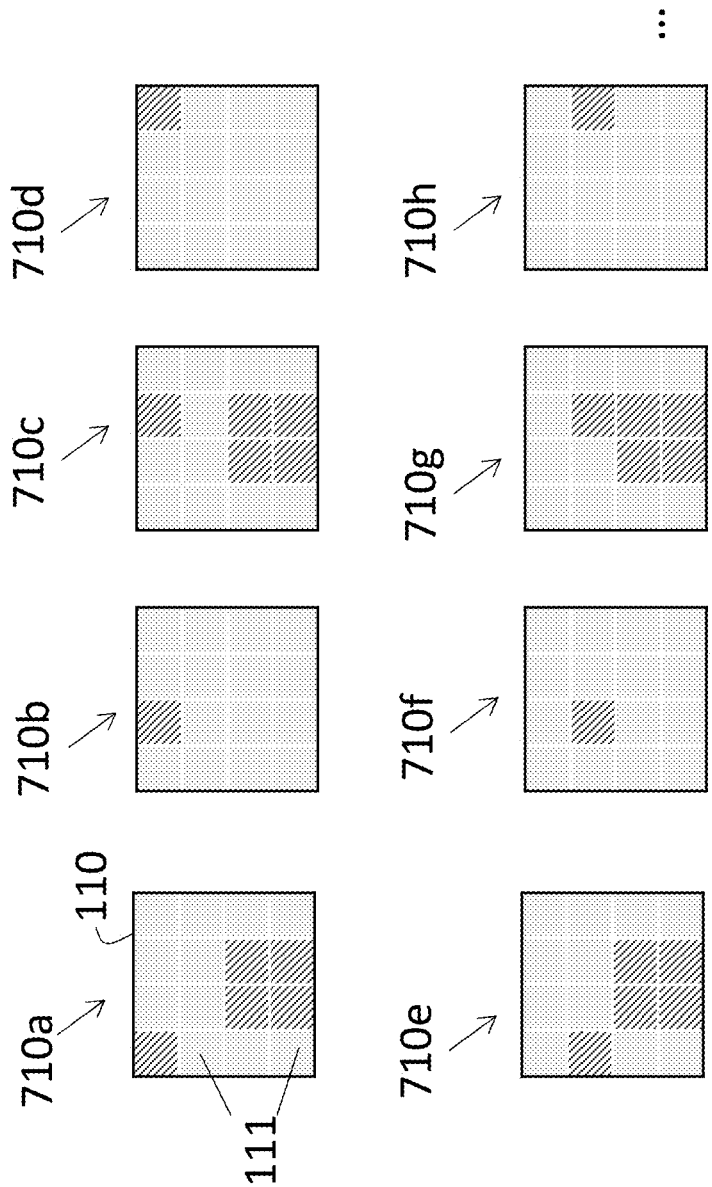
FIG. 7 shows an array lidar that performs adaptive scans according to an embodiment.

FIG. 7 shows an array lidar 110 that performs adaptive scans 710 according to an embodiment. An exemplary array lidar 110 with sixteen lasers 111 is shown again, and transmitting lasers 111 are indicated by diagonal lines again. According to the present embodiment, a raster scan is combined with a periodic scan of a region of interest by the array lidar 110. That is, scans 710a through 710h resemble scans 410a through 410h but, additionally, scans 710a, 710c, 710e, and 710g include transmission by four more lasers 111. As noted with reference to FIG. 4, the pattern of the raster scan 410 may continue for the bottom two rows of the array lidar 110 and, alternately, the scan may be done one column at a time rather than one row at a time, as shown. This exemplary adaptive scan 710 may be used when an area of interest has been identified as the area illuminated by the four additionally transmitting lasers 111 in scans 710a, 710c, 710e, and 710g, for example. This adaptive scan 710 allows the area of interest to be monitored at the same time that other areas are scanned. The adaptive scan 710 may be selected when the area of interest is identified based on one of the scan patterns discussed with reference to FIGS. 4-6 or when the area of interest is identified by another sensor 810 (FIG. 8), as discussed below.

Figure 8:
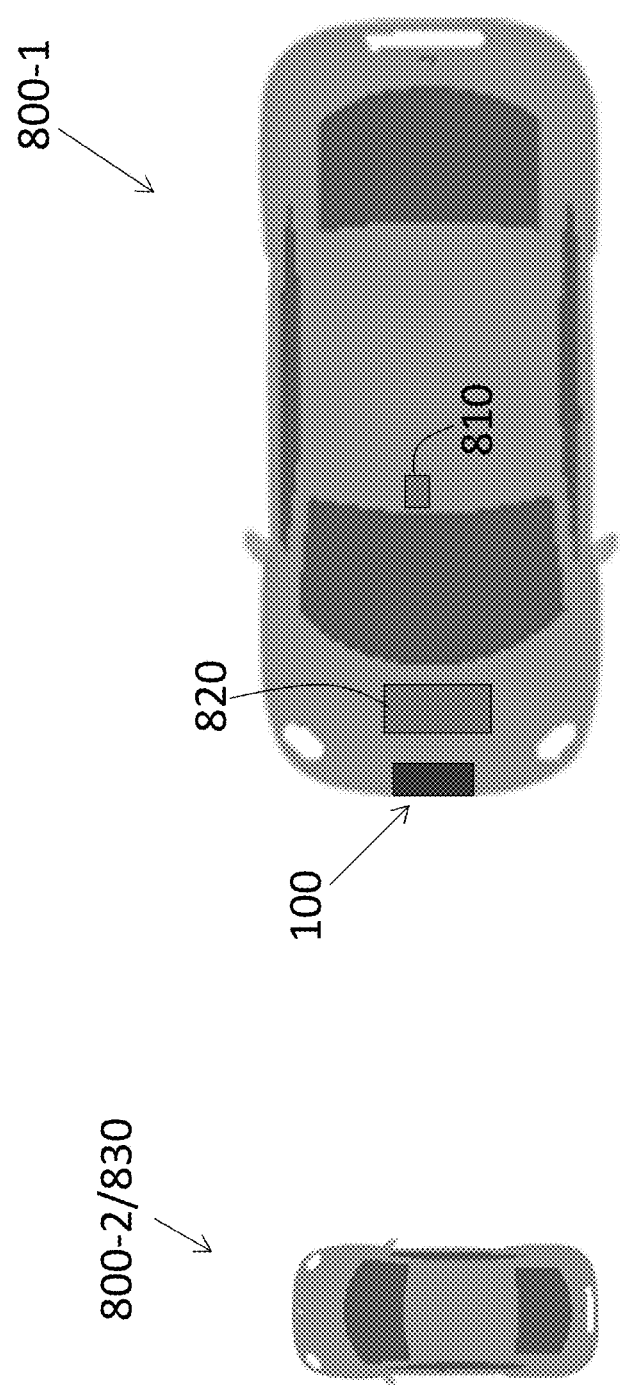
FIG. 8 shows an exemplary platform for the array lidar system according to embodiments.
Figure 9:
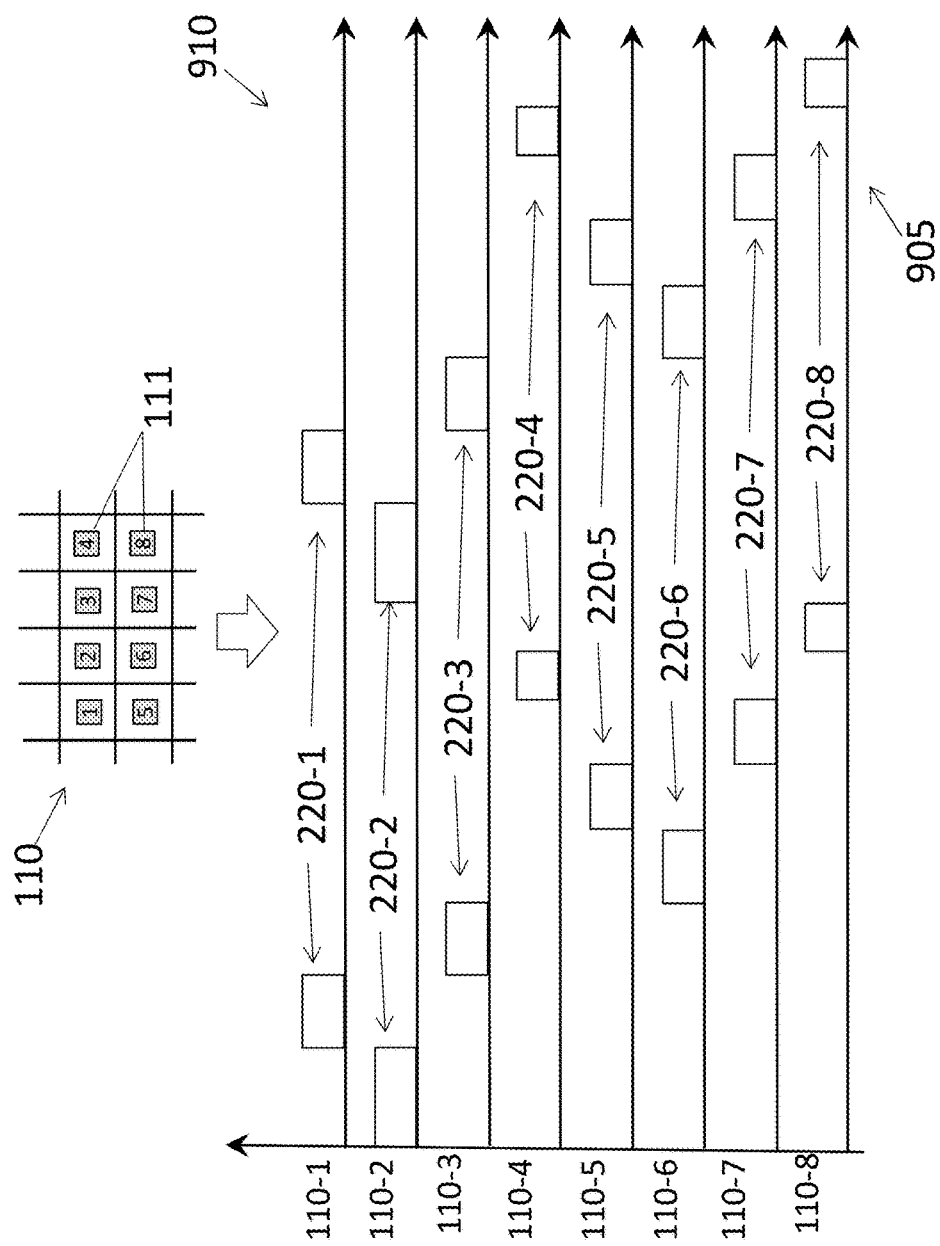
FIG. 9 shows an exemplary scanning pattern for an array lidar system according to an embodiment.

FIG. 8 shows an exemplary platform for the array lidar system 100, according to embodiments. As noted above, array lidar systems 100 may be used for landslide investigations, archaeology, oil and gas exploration, meteorology, and navigation (e.g., obstacle detection) in automotive applications, for example. FIG. 8 shows two vehicles 800-1, 800-2. The two vehicles 800-1, 800-2 are not shown to scale but the relative size is intended to convey that the two vehicles 800-1, 800-2 are not adjacent to each other, as shown, but are, instead, some distance apart. While both vehicles 800-1, 800-2 could include an array lidar 110, vehicle 810-1 is shown as an exemplary platform for the array lidar system 100 according to embodiments, and vehicle 800-2 is shown as an exemplary target 830. The exemplary vehicle 800-1 in FIG. 8 includes additional sensors 810 such as a camera, global positioning sensor (GPS), another lidar-based sensor, or radar system, for example. In addition to the scanning scenarios discussed above, information from the other sensors 810 may additionally or alternately provide an indication of an area of interest (e.g., an area in which the target 830 is approaching). The information may be provided to a processing system 820 that communicates with both the array lidar system 100 and the other one or more sensors 810. In alternate embodiments, the processing system 130 of the array lidar system 100 may be the same as the processing system 820 of the vehicle 800-1. The area of interest may be monitored, as shown by the scans 710 in FIG. 7. One or more lasers 111 associated with the area of interest may use a longer pulse burst 220 duration than other lasers 111 (e.g., those performing the raster scan), as further discussed with reference to FIG. 9.

FIG. 9 shows an exemplary scanning pattern 910 for an array lidar system 100 according to an embodiment. An exemplary array lidar 110 with eight lasers 111 is shown. Time is indicated along the axis 905, and each of the scanning pattern 910 specific to each laser 111 is shown in association with the number of the laser 111. The scanning pattern 910 indicates the time of transmission and duration of pulse bursts 220 from each of the lasers 111 of the array lidar 110. As FIG. 9 shows, the pulse bursts 220-2 transmitted by the laser 111-2 have a longer duration than those transmitted by any other laser 111. Thus, laser 111-2 has increased detection capacity, and longer range and accuracy of detection. Laser 111-2 may be chosen to transmit the longest pulse burst 220-2 as a result of a target 830 (FIG. 8) being identified in the field of view of laser 111-2.

The identification of the target 830 (FIG. 8) may have been done by another sensor 810, through the processing system 820, or may have been done through scanning with laser 111-2 itself (perhaps with a smaller pulse burst 220 duration). The pattern 910 may be thought of as an adaptive track-while-scanning pattern, because laser 111-2 tracks a target 830 while other lasers 111 of the array lidar 110 scan for additional targets 830 or a movement of the target 830 into a field of view of one of the other lasers 111. For example, lasers 111-1, 111-3, and 111-6, which surround laser 111-2 in the exemplary array lidar 110, transmit the second-longest pulse bursts 220-1, 220-3, 220-6 and may enable early detection of the transition of the target 830 out of the field of view of laser 111-2 and into a neighboring pixel. Lasers 111-5 and 111-7, which are diagonally adjacent to laser 111-2 in the exemplary array lidar 110, transmit shorter pulse bursts 220-5, 220-7 than lasers 111-1, 111-3, and 111-6 and may provide additional illumination to a target 830 moving out of the field of view of laser 111-2. Pulse bursts 220-4, 220-8 transmitted by lasers 111-4 and 111-8 have the shortest durations shown in FIG. 9. These lasers 111-4 and 111-8 are farthest from laser 111-2 and may be used for regular search.

The array lidar 110 transmission pattern 910 may change as the target 830 being tracked by laser 111-2 moves or leaves the field of view of the array lidar 110, as another target 830 is identified, or based on additional information. This additional information may include information about the priority of targets when more than one target is detected. That is, for example, laser 111-2 and laser 111-6 may both be tracking targets 830, but if the priority of a target 830 being tracked by laser 111-2 is higher, then the pulse burst 220-2 may be longer than the pulse burst 220-6. The additional information may also be information (e.g., signal-to-noise ratio (SNR)) obtained at the detector array 120 or information about sunlight, as discussed with reference to FIG. 10.

Figure 10:
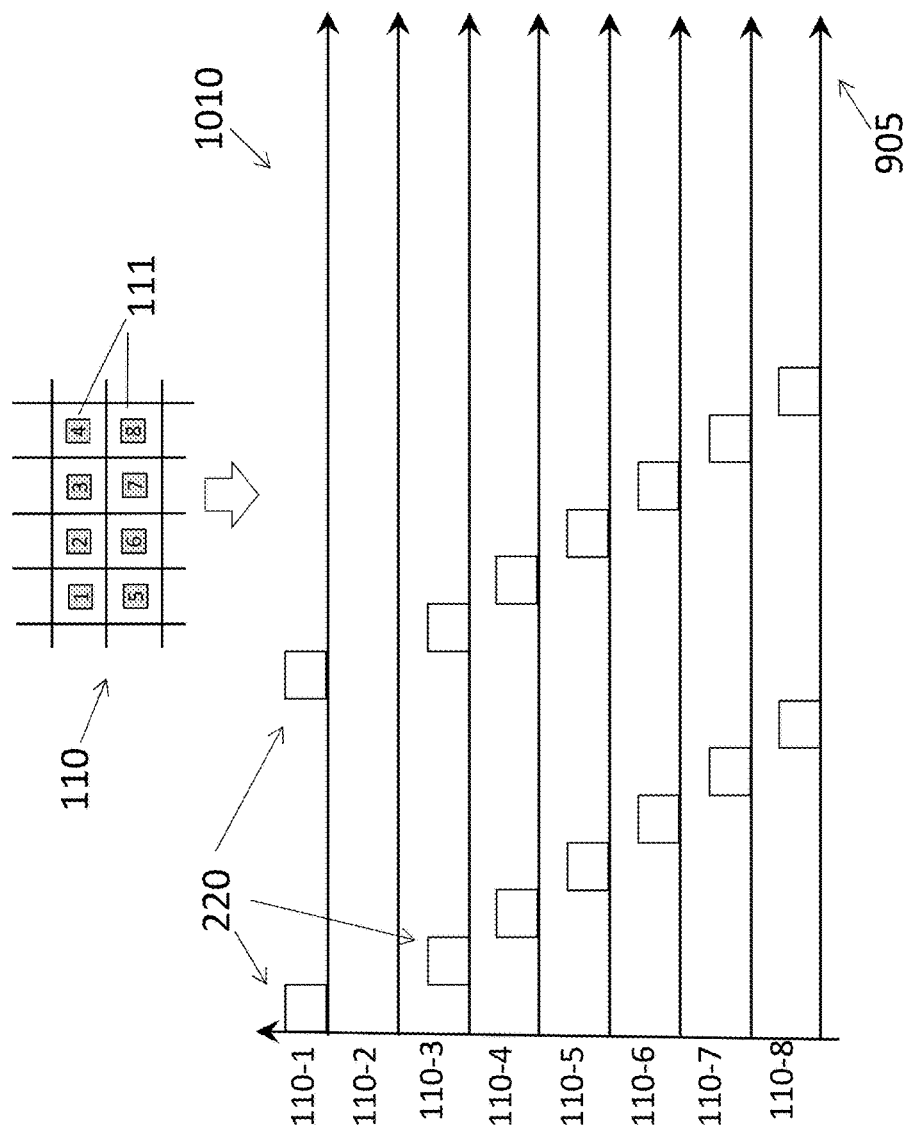
FIG. 10 shows an exemplary scanning pattern for an array lidar system according to an embodiment.

FIG. 10 shows an exemplary scanning pattern 1010 for an array lidar system 100 according to an embodiment. As in FIG. 9, an exemplary array lidar 110 with eight lasers 111 is shown. As FIG. 10 indicates, the pulse bursts 220 transmitted by each of the lasers 111-1 and 111-3 through 111-8 are of the same duration. Laser 111-2 has no transmissions in the exemplary scanning patter 1010. This may be because reflections resulting from transmissions from laser 111-2 include sunlight or another interfering light source. The interfering light source artificially increases the intensity of reflections and thereby negatively affects detection capability for a period of time. As such, the scenario may be referred to as temporal blindness. When a raster scan (e.g., 410) is done, a laser 111 in the array lidar 110 that is experiencing the temporal blindness may be skipped. That is, for example, in FIG. 4, scan 410f may directly precede scan 410h when the laser 111 shown illuminated in scan 410g experiences temporal blindness.

In addition to information about a target 830 (FIG. 8) location or sunlight, SNR may be another factor that affects the scan pattern implemented with the array lidar 110. When SNR is below a threshold value for reflections detected at the detector array 120 resulting from transmissions from a given laser 111, the duration of the pulse burst 220 transmitted by that laser 111 may be increased. Additionally or alternatively, the received signals resulting from transmissions of that laser 111 may be summed until the SNR threshold is reached. In this case, transmissions of a given pulse burst 220 duration may be repeated (with or without using other lasers 111 of the array lidar 110 between transmissions) until the SNR is reached by the accumulated reflections. Rather than a threshold SNR, a threshold improvement in SNR may be of interest according to some embodiments. Thus, accumulations of reflections may continue until the resulting improvement in SNR falls below a threshold value.

Figure 11:
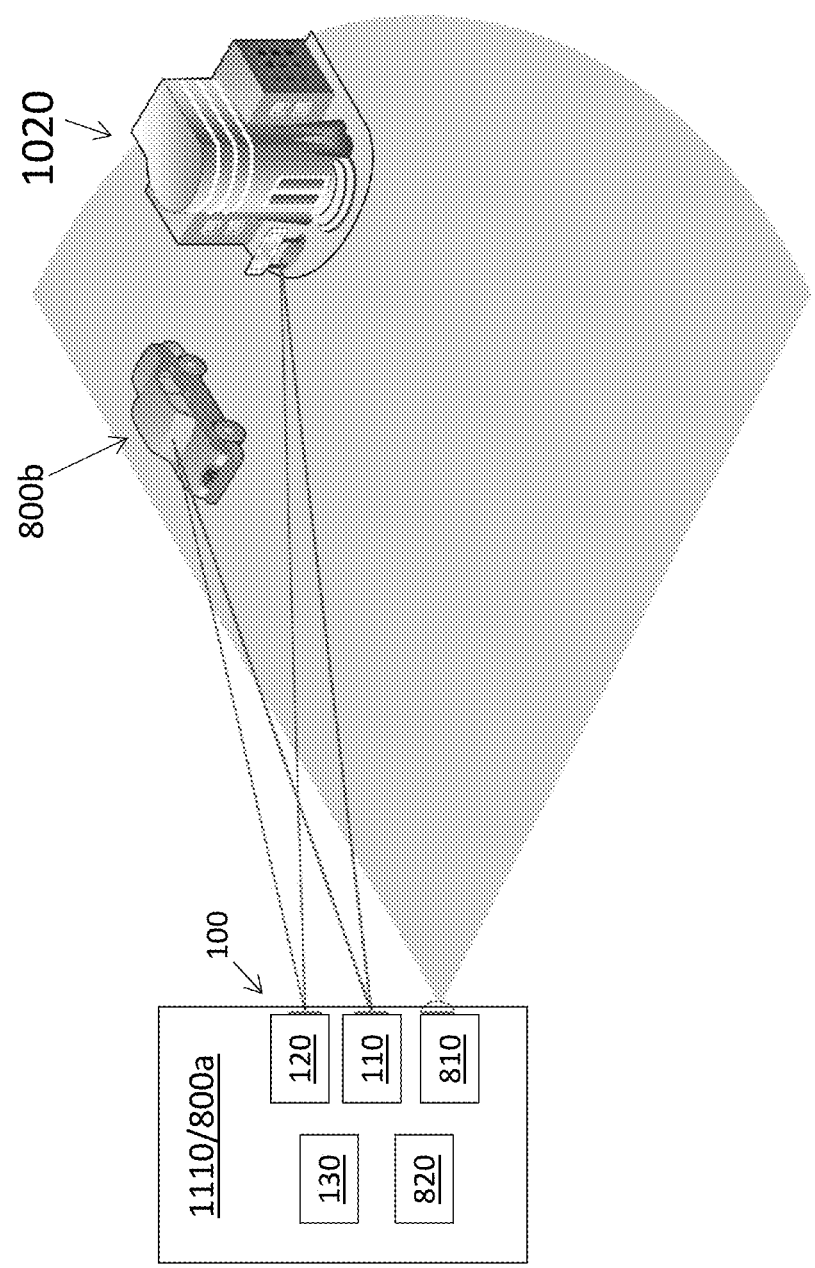
FIG. 11 illustrates an exemplary scenario in which adaptive scanning is employed according to an embodiment.

FIG. 11 illustrates an exemplary scenario in which adaptive scanning is employed according to an embodiment. The platform 1110 for the array lidar system 100 may be a vehicle 800a. The platform 1110 also includes another sensor 810 such as a camera, for example. The scenario involves two targets in the field of view of the array lidar 110 such as a vehicle 800b and a building 1020. The additional sensor 810 (e.g., camera) indicates that the vehicle 800b is a target of interest while the building 1020 is not of interest. This determination may be made based on image processing by the processing system 820 of the vehicle 800a and may involve additional components such as a collision avoidance system of the vehicle 800a. As noted above, the processing system 820 and the processing system 130 of the array lidar system 100 may be the same processor or may communicate with each other. Based on the indication that the vehicle 800b is the target of interest, the processing system 130 controls the array lidar 110 to operate only the subset of the lasers 111 of the array lidar 110 that have the vehicle 800b in their field of view. This decrease in the number of lasers 111 operated results in an increased scan rate or an increased number of pulses per measurement, for example. As a result, the signal-to-noise (SNR) ratio increases. Alternately, the array lidar system 100 may have been performing a scan (e.g., a raster scan 410 as shown in FIG. 4) when the indication of the target of interest is provided. By operating more lasers 111 based on the indication (than were used in the scan), the spatial resolution is increased. Although the exemplary scenario involves a camera as the additional sensor 810, a radar or a vehicle fusion system that coordinates the responses of all the sensors 810 of the platform 1110 may be used, as well.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of operating an array lidar system comprising a plurality of illuminators on a platform, the method comprising:
controlling a first set of the plurality of illuminators to transmit for a first duration;
controlling a second set of the plurality of illuminators to transmit for a second duration; and
receiving and processing reflections resulting from the first set of the plurality of illuminators and the second set of the plurality of illuminators, wherein the controlling the first set of the plurality of illuminators and the controlling the second set of the plurality of illuminators includes performing an adaptive scan based on obtaining information and the performing the adaptive scan includes increasing a pulse burst duration of one or more of the plurality of illuminators based on the information.

2. The method according to claim 1, wherein the controlling the first set of the plurality of illuminators includes one of controlling illuminators among the plurality of illuminators that are arranged in a row and the controlling the second set of the plurality of illuminators includes controlling illuminators among the plurality of illuminators that are arranged in another row or the controlling the first set of the plurality of illuminators includes controlling illuminators among the plurality of illuminators that are arranged in a column and the controlling the second set of the plurality of illuminators includes controlling illuminators among the plurality of illuminators that are arranged in another column.

3. The method according to claim 1, wherein the controlling the first set of the plurality of illuminators includes controlling one of the plurality of illuminators and the controlling the second set of the plurality of illuminators includes controlling another one of the plurality of illuminators.

4. The method according to claim 1, wherein the obtaining the information includes obtaining a location of a target of interest and the increasing the pulse burst duration of the one or more of the plurality of illuminators includes increasing the pulse burst duration of the one or more of the plurality of illuminators associated with the location.

5. The method according to claim 1, wherein the obtaining the information includes determining that one or more of the plurality of illuminators is affected by an interfering light source and the performing the adaptive scan includes refraining from transmitting with the one or more of the plurality of illuminators.

6. The method according to claim 1, wherein the obtaining the information includes determining a signal-to-noise ratio (SNR) of the reflections and the increasing the pulse burst duration of the one or more of the plurality of illuminators includes increasing the pulse burst duration of the one or more of the plurality of illuminators that result in the SNR being below a threshold.

7. An array lidar system on a platform, the system comprising:
a plurality of illuminators arranged in an array; and
a controller configured to control a first set of the plurality of illuminators to transmit for a first duration, to control a second set of the plurality of illuminators to transmit for a second duration, and to receive and process reflections resulting from the first set of the plurality of illuminators and the second set of the plurality of illuminators, wherein the controller controls the plurality of illuminators based on receiving information, and the controller increases a pulse burst duration of one or more of the plurality of illuminators based on the information.

8. The system according to claim 7, wherein the first set of the plurality of illuminators is arranged in a row of the array and the second set of the plurality of illuminators is arranged in another row of the array or the first set of the plurality of illuminators is arranged in a column of the array and the second set of the plurality of illuminators is arranged in another column of the array.

9. The system according to claim 7, wherein the first set of the plurality of illuminators is one of the plurality of illuminators and the second set of the plurality of illuminators is another one of the plurality of illuminators.

10. The system according to claim 7, wherein the information includes a location of a target of interest, and the controller increases the pulse burst duration of the one or more of the plurality of illuminators associated with the location.

11. The system according to claim 10, wherein the controller receives the information about the location from an auxiliary sensor.

12. The system according to claim 7, wherein the information includes information that one or more of the plurality of illuminators is affected by an interfering light source and the controller prevents transmissions from the one or more of the plurality of illuminators.

13. The system according to claim 7, wherein the information is a signal-to-noise ratio (SNR) of the reflections and the controller increases the pulse burst duration of the one or more of the plurality of illuminators that result in the SNR being below a threshold.

* * * * *